Mar. 13, 1923.
C. L. HOMMEL
1,448,219
SYSTEM FOR THE GENERATION AND DISTRIBUTION OF ELECTRICAL ENERGY
Filed Oct. 14, 1915
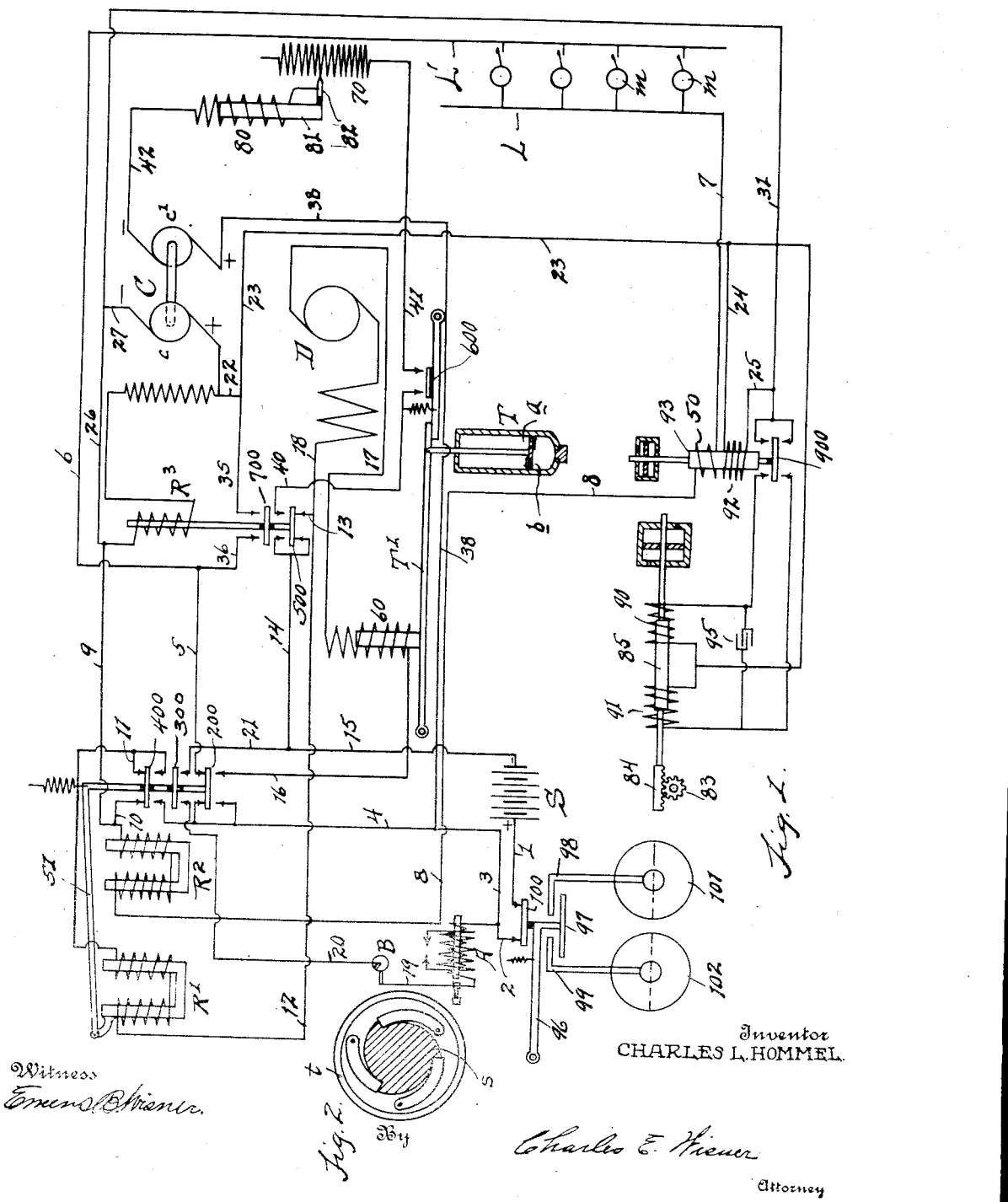
Witness
Emens B. Wiener
Inventor
CHARLES L. HOMMEL.
By
Charles E. Wiener
Attorney Patented Mar. 13, 1923.

1,448,219

UNITED STATES PATENT OFFICE.

CHARLES L. HOMMEL, OF DETROIT, MICHIGAN.

SYSTEM FOR THE GENERATION AND DISTRIBUTION OF ELECTRICAL ENERGY.

Application filed October 14, 1915. Serial No. 55,772.

*To all whom it may concern:*

Be it known that I, CHARLES L. HOMMEL, a citizen of the United States, residing at Detroit, county of Wayne, State of Michigan, have invented a certain new and useful Improvement in a System for the Generation and Distribution of Electrical Energy, and declare the following to be a full, clear, and exact description of the same, such as will enable others skilled in the art to which it pertains to make and use the same, reference being had to the accompanying drawings, which form a part of this specification.

This invention relates to a system for the generation and distribution of electrical energy and its object is an automatic system in which a prime mover is utilized to operate a generator and which is set into operation through a demand for current in the load circuit. The system involves the use of a starting device for the prime mover together with circuits and controlling devices of suitable form whereby the closing of a switch to a lamp or other instrumentality in the load circuit, first produces operation of the generator by means of the starting device and prime mover, and upon the demand for current in the load circuit ceasing, the prime mover will cease operation and the system be returned to condition to again be set into operation by a subsequent demand for current in the load circuit.

A further object of the invention is a system of the character stated in which the generator is arranged to deliver current directly to the load circuit without the use of a storage battery in the line whereby a current of high voltage may be generated and distributed without the use of large and expensive batteries and allowing the use of standard equipment in the load circuit. In such well known systems in which a battery is utilized in the line, to avoid excessive expense, a 32 volt battery is usually used requiring special apparatus and large circuit wires. By the arrangement herein disclosed, in which a current of 110 volts is produced and distributed, less copper is required in the circuits and comparatively inexpensive standard equipment may be utilized. An object of the invention, therefore, is a cheap and economical system for the generation and distribution of electric current.

A further object of the invention is a generating unit and electric distribution system, including such devices as a starting motor, relays, and the like, particularly adapted for use with an internal combustion engine as a prime mover. Another object of the invention is a system of the character stated including an internal combustion engine provided with a means by which the speed of the engine and generator may be automatically varied as the potential of the load circuit is inversely varied, whereby the potential at the center of distribution of the load circuit may be maintained practically constant. A further object of the invention is an automatic system for the distribution of electric current involving an internal combustion engine as a prime mover and utilizing an electric motor for starting purposes, the motor being operated by a small storage battery of low voltage and another object of the invention resides in the means employed to regulate the amount of current used for recharging the storage battery so that the value of the recharging current remains constant irrespective of variation in value of the potential delivered by the recharging generator.

An additional object of the invention is a system of the character stated in which the generator is arranged to deliver current directly to the load circuit, automatically set into operation through the closing of a switch in the load circuit in which circuit an electric motor is utilized to start the system in operation, in combination with which a storage battery is utilized to energize the motor and a separate generating unit provided for recharging the battery, the starting system being automatically cut out of operation prior to the recharging interval.

A further object is an automatic timing device by means of which the time that the recharging unit is connected to the battery is governed by the total amount of energy drawn from the battery.

Another object of the invention is a system of the character stated utilizing an internal combustion engine as a prime mover so arranged that it is impossible to set the system in operation by closing a switch in the load circuit in the usual manner if there be insufficient water or gasoline in the respective receptacles therefor.

These and other various objects and the several novel features of the invention are hereinafter more fully described and claimed. In the accompanying drawings Fig. 1 diagrammatically illustrates several translating devices and circuits in their preferred arrangement by means of which all the above and other objects may be attained.

Fig. 2 is a detail of the clutch between the starting motor and the engine.

The prime mover may be of any well known form, preferably of the internal combustion type, of which only the spark coil A and the timer B are shown in the drawing. While only a single pair of sparking points are shown, a plurality of such instrumentalities may be utilized depending upon the requirement of the engine. The engine is to be understood as operating the generator shown diagrammatically at C and a small 6 volt starting motor is diagrammatically indicated at D. The starting motor is connected to the internal combustion engine in any suitable manner whereby energization of the motor turns the engine shaft, and as the engine begins to operate the motor is automatically released in connection therewith. One form of clutch suitable for this purpose is indicated in Fig. 2, in which the shaft $s$ of the starting motor is shown as having a ratchet formation, while the hub $t$ of the engine shaft is provided with a series of pawls adapted to engage the ratchet teeth of the shaft $s$. On rotation of the shaft $s$ in the direction indicated by the arrow due to energization of the motor, the hub $t$ and the connected engine shaft is also rotated and as the engine attains sufficient speed under its own power the pawls are withdrawn from the ratchet by centrifugal force. Various other suitable arrangements for this purpose may also be utilized.

With this understanding of the operative relationship and the arrangement of various parts, the electrical circuits, relays and the like utilized for automatically setting the system into operation and for distribution of current will be readily understood. The load circuit is shown at L and $L^1$ and the various translating devices in the load circuit, as lamps, electric motors and the like, are illustrated diagrammatically at $m$ of which several are shown each provided with a switch for closing the circuit through the instrument. A small 6 volt storage battery S is utilized for starting purposes and for energizing the ignition circuit for the internal combustion engine.

The system, as shown diagrammatically in Fig. 1, is in normal and nonoperating condition, and to start the system into operation, it is only necessary to close a switch across the load circuit to any one of the instrumentalities $m$. The path of current upon closing a switch is from the positive side of the battery, to line 1, switch 100, lines 2, 3, 4, upper contacts of switch 200, lines 5, 6, load circuit $L^1$, through connected instrument to load circuit L, lines 7, coil 50, line 8, relay $R^2$, line 10, upper contacts of switch 400, line 11, relay $R^1$, lines 12, 13, lower contacts of switch 500, lines 14, 15 to negative side of the battery. The energization of the relays $R^1$ and $R^2$ actuates the spring restrained switch arm 51 breaking the upper contacts to the switches 200 and 400, and closing the switch 300 and the lower contacts of the switches 200 and 400. Actuation of the switch parts momentarily breaks the closed circuit but the inertia of the moving parts is sufficient to carry the switches to the lower contacts which establishes a new circuit through one of the relay coils and holds the switch lever 51 down and lower contacts of the switches closed. The relays may be of any approved type in which the coil of $R^1$ is a high resistance coil and $R^2$ is a low resistance coil.

Three circuits are closed and one opened by energization of the relays $R^1$ and $R^2$. The circuit opened is a circuit through the load circuit, relay $R^2$ and the battery through the upper contacts of switch 400. The three circuits closed are as follows— First, from the battery through line 1, switch 100, line 2, primary of spark coil A, line 19, engine timer B, line 20, switch 300, lines 21 and 15 to the opposite side of the battery. The ignition circuit for the engine is thus energized and is controlled in the usual manner by a timer B. Second—between the battery and starting motor as follows— Positive side of the battery to line 1, switch 100, lines 2, 3, 4, lower contact switch 200, line 16, coil 60, line 17, 6 volt series starting motor D, lines 18, 13, lower contact switch 500, lines 14, 15, negative side of battery. Third circuit closed by the switch arm 51 is from the positive side of the battery to line 1, switch 100, lines 2, 3, 4, lower contact switch 400, line 11, relay $R^1$, line 12, lines 13, lower contact switch 500, lines 14, 15, to negative side of the battery. Current flowing by the second circuit established through the coil 60, which is of the solenoid type with a movable core, raises the piston of the battery recharging timer T and continues to raise it until relay $R^3$ is energized. The switch 600 is normally held open by the recharging timer T, the operating lever $T^1$ of which engages the end of the spring restrained lever of switch 600. The raising of the timer lever through energization of the coil 60 closes the contacts of the switch 600. This, however, does not close any circuit. The internal combustion engine being in condition for operation by reason of energization of the ignition circuit (which is the first circuit above described), the energization of the second circuit above described energizes the starting motor and the internal combustion engine begins to operate under its own power and drives the generator. The generator has two armature windings operating under the same magnetic field.

The potential generated in one winding $c$ equals 110 volts, while the potential generated in the other winding $c^1$ equals 10 volts. As the generator comes up to speed, relay $R^3$, which is connected in series with the generator field and adapted to operate at nearly full potential, is actuated thereby closing the switch 700 connecting the load circuit to the generator $c$. The circuit thus formed is from the positive side of the generator to lines 22, 35, switch 700, lines 36, 6, through the connected device on the load circuit, line 7, series coil 50, line 8, relay $R^2$, lines 9, 26, 27, to the negative side of the generator. The energization of relay $R^3$ by this circuit not only closes the upper contact of switch 500 and breaks the lower contacts thereof, but also opens the circuit between the battery and the starting motor and closes the circuit between the battery and 10 volt generator $c^1$. The breaking of the circuit between the battery and the starting motor causes the coil 60 to release the battery recharging timer lever $T^1$ which falls by gravity in the manner hereinafter described. The circuit between the 10 volt generator $c^1$ and the battery established by energization of the relay $R^3$ is as follows— From the positive side of the generator $c^1$, lines 38, 3, 2, switch 100, line 1, positive side of the battery, lines 15, 14, upper contacts of switch 500, line 40, switch 600, line 41, through the resistance coil 70, solenoid coil 80, line 42, to the negative side of the generator $c^1$. This circuit recharges the battery S and the battery continues to be recharged as long as the switch 600 is closed. This switch 600 is controlled by operation of the recharging timer T which may be of any approved form to accomplish the object. The preferable form being in the nature of a casing in which a piston is adapted to travel. The casing is filled with oil and the piston is provided with two apertures $a$ and $b$. The aperture $a$ is larger than the aperture $b$ and is provided with a valve adapted to open on upward movement of the piston in the case and close on downward movement thereof, while the aperture $b$ is provided with a valve which opens on downward movement of the piston and closes on upward movement thereof. The aperture $a$ being comparatively large allows the piston to move upward through energization of the coil 60 comparatively freely, while the downward movement is retarded by reason of the smallness of the aperture $b$ to maintain the battery in circuit with the 10 volt generator for a sufficient period to properly recharge the battery S. The coil 60 and core therefor and the timer T are so constructed and arranged that the lever $T^1$ will continue to raise during the full period that the battery is connected with the starting motor under normal conditions. The time required for the lever $T^1$ and connected piston to fall after being released by the coil 60 determines the time the battery is connected with the recharging generator. The battery is thus recharged for a time at least equal to the time of discharge but by reason of the difference in size of the apertures in the timer piston the return of the piston is retarded so that the time of recharging is greater to allow for leakage and loss of current through the ignition circuit. On the piston of the timer nearing its lowermost point of its movement the switch 600 is opened and the battery cut off from the 10 volt generator.

Relay $R^2$ is a low resistance relay and acts as a holding coil for the relay $R^1$, holding the switch arm down when the circuit through relay $R^1$ is broken, and the energization of relay $R^2$ and maintaining of the circuit closed through switch 300 depends upon current flowing through the load circuit. The relay $R^2$ being in series with the load circuit, when all the devices on the load circuits are disconnected relay $R^2$ releases, breaking the ignition circuit and stopping the engine. When the engine stops the switches return to normal position shown in the diagram and the system may again be set in operation by closing a switch across the load circuit. The coil 80 is utilized to regulate the amount of current used for recharging the battery. The coil is provided with a movable core 81 and when the coil is energized the "pull" may be just sufficient to balance the weight of the core. The core is provided with a contact point 82 secured to and insulated therefrom but connected with the coil 80 and adapted to contact various points on the resistance coil 70 in which the parts are so arranged that when the core raises, the resistance in the circuit is increased, and when it lowers the resistance is decreased. As a certain number of ampere turns are required to produce a pull sufficient to balance the core, and as the number of turns is constant then the number of amperes must also be constant. Therefore any increase or decrease in current passing through a coil 80 will respectively increase or decrease the resistance to flow. The value of the current flowing to the battery S, therefore, remains constant. In a system of the character described, it is desirable to maintain the voltage practically constant at the center of distribution of the load circuit regardless of the load. This may be accomplished by increasing the speed of the engine in accordance with fluctuations produced by variations in the load. Automatic variation in speed of the engine may be produced by the following described circuits. As is well known, an internal combustion engine may be varied in speed by the opening or closing of a throttle valve and the throttle valve of the engine is to be considered in the case to be mechanically connected with a gear 83 indicated in Fig. 1, and rotation of the gear in one direction being adapted to open the throttle and rotation in the other direction being adapted to close the throttle. The rack 84 is in mesh with the gear, and is mechanically connected with the movable core 85 common to the two coils 90 and 91. The core 85 and the core of the coil 50 are each connected with a dash-pot individual thereto to prevent too sudden movement of the core in either case. The core of the coil 50 is also common to the core of the coil 92 and is adapted to operate the switch 900. The core 93 of the two coils 50 and 92, when no current is passing therethrough, falls by gravity. The current passing through the coil 50 is in series with the load and generates a magneto-motive force which opposes the magneto-motive force of the coil 92. It is also to be seen that the coil 92 is connected across the brush terminals of the 110 volt generator, the circuit being from the positive side of generator C, to lines 22, 23, 24, through the coil 92, to lines 25, 31, 27, to the negative side of generator. The coil 50 being in series with the load opposes the coil 92 by an amount that will make it necessary for the generator to generate a potential in excess of 110 volts equal to the amount of the line drop in order to balance the core. When the voltage decreases to such extent that the magneto-motive force generated is no longer sufficient to balance the core, the downward movement of the core closes the lower contacts of switch 900 thereby energizing the coil 91 moving the core 85 and consequently rotating the gear 83 in a manner to open the engine throttle to increase the engine speed until sufficient voltage is being generated to raise the core and open the lower contacts of the switch 900. The opposite effect is produced when the generated potential is too great, as the core is raised until the upper contacts of switch 900 are closed thereby energizing the coil 90 which moves the core 85 in a manner to close the engine throttle until the engine slows down to the proper speed and the upper contacts of switch 900 are opened. Condensers 95 are bridged across the coils to prevent sparking at the switch points.

It is to be noted that if the switch 100 be open the system may not be put into operation. The purpose of this switch is to prevent operation of the system if the cooling water or fuel supply are too low for continuous operation of the engine. The switch plate is supported on a pivoted lever 96 provided with a spring tending to hold the switch normally closed. The switch is provided with a depending portion 97 adapted to be engaged by the ends 98 or 99 respectively of the two floats 101 or 102. It is to be understood that the position of these floats is determined by the level of the fluid in the fuel or water receptacle in which they are respectively positioned. If there be sufficient fall in the level of fluid in either receptacle, the projecting portion 98 or 99 as the case may be engages the part 97 and by gravity opens the switch 100. It is thus impossible to start the system in operation with a lack of fuel or cooling water for the engine, as the battery circuit under such condition is open. Also if the system is in operation and the fuel or water falls below a predetermined level, the switch 100 will be opened, thus breaking the circuit between the battery and the ignition circuit and thereby stopping the engine.

From the foregoing description of the operation of the various instrumentalities and circuits used in connection therewith, it becomes evident that the system is automatic in operation requiring simply the closing of a switch across the load circuit to energize a circuit by means of the battery which closes a circuit to connect the battery with the starting motor and also completes an ignition circuit for the engine through the battery, which is the sole purpose of the said battery. The operation of the starting motor and energization of the ignition circuit starts the internal combustion engine operating the generators. Energization of the starting motor circuit sets the timer and closes a switch in the circuit between the recharging generator and the battery. As the 110 volt generator begins to deliver current, the relay $R^3$ is energized breaking the circuit between the starting motor and the battery and completing the circuit between the recharging generator and the battery. This circuit between the 10 volt generator and the battery continues to be closed until the switch 600 is opened by movement of the timer lever near the bottom of its stroke, which lever is released to actuation by gravity on the breaking of the circuit between the battery and the starting motor. Actuation of the relay $R^3$ caused by operation of the 110 volt generator closes a switch 700 connecting the generator to the load circuit. This relay is set to operate at nearly full potential (about 100 volts). Consequently the load circuit is not closed to the generator until the generator is capable of delivering practically full voltage. Upon actuation of the relay $R^3$ therefore and the closing of the circuit between the 110 volt generator and the load, the system is in condition to continuously deliver current to any translating device connected across the load circuit. By use of what I have termed a potential governor (comprising the coils 50 and 92 and core 93, coils 90, 91, and core 85, through which the throttle of the engine is controlled) the value of the potential generated may be automatically varied within certain limits by variation in the speed of the engine and generator to compensate for loss in the line which is ordinarily termed the "line drop" or the drop in potential, which varies with each variation in current demanded by the connected instrumentalities. By this arrangement variation in current demanded by the load circuit produces a demand for greater or less potential as the case may be at the generator. Within the capacity of the generating unit the demand is complied with by generation of greater or less potential at the generators. Therefore the potential delivered is automatically maintained at practically constant value throughout all variations in current demanded by the connected devices in the load circuit.

If all the switches but one bridging the load circuit are open, then the opening of the last switch stops the operation of the system, for the reason that the relay $R^2$ is released releasing the switches 200, 300, 400 from the lower contacts, opening the circuit between the storage battery and the spark coil and stopping the engine, whereupon all switches return to normal position and condition to again be actuated by the closing of a switch across the load circuit. Aside from the fact that switch 100 must be maintained closed by proper maintenance of the fuel and water levels in the respective receptacles, the entire system is brought into operation by the closing of any switch across the load circuit, and the system is automatically stopped by the simple opening of the last switch in the said circuit. The system is thus peculiarly adapted for use by persons unskilled in the operation of electrical devices as the only act required to set the system into operation or to stop it from operation is the simple closing or opening of a switch. The instrumentalities of the system then automatically perform the various required succeeding opening or closing of the various circuits and delivering of full voltage to the line, or ceasing from the performance of such function without thought upon part of the operator.

The system, therefore, is one that is particularly adapted for use in isolated places, summer homes, hotels, or any place where an independent system for the generation of electrical current is deemed desirable.

Having thus described my invention, its utility and mode of operation, what I claim and desire to secure by Letters Patent of the United States is—

1. In an automatic system for the generation and distribution of electric energy, the combination with an electric generator, of a prime mover operatively connected therewith, a load circuit, a storage battery automatically disassociated with the load circuit during operation of the generator, said battery being of substantially lower potential than the generated current, a recharging circuit for said battery, an electric motor adapted for starting the prime mover, the said load circuit having translating devices adapted to be connected thereacross, a circuit established by the connection of any translating device across the load circuit adapted to establish a circuit between the starting motor and battery, electro-magnetic means actuated by the potential of the generator for electrically connecting the generator and load circuit and simultaneously disconnecting the starting motor and battery and connecting the battery in the recharging circuit.

2. In an automatic system for the generation and distribution of electric energy, the combination with an electric generator, of an internal combustion engine operatively connected therewith, a load circuit including translating devices supplied with operating current from the electric generator only, an electric motor adapted to start the said engine, a storage battery of substantially lower potential than the generated current and arranged to be connected with the load circuit only during nonoperation of the generator and automatically disconnected therewith upon operation of the generator, a recharging circuit for the battery, a circuit through the storage battery and electric motor and an ignition circuit for the engine both established by connection of any translating device across the load circuit and adapted to start the motor and operate the engine, electro-magnetic means operated by the generated potential electrically connecting the generator and load circuit and simultaneously opening the circuit between the starting motor and battery and connecting the battery in the recharging circuit.

3. In an automatic system for the generation and distribution of electric energy, the combination with an electric generator, of an internal combustion engine operatively connected therewith, an ignition circuit therefor, a motor for starting the engine, a load circuit having translating devices adapted to be connected thereacross, a storage battery, a circuit including the battery established by the connection of any translating device across the load circuit, closing of said battery-translating device circuit establishing a circuit between the starting motor and battery to start the engine and operate the generator, an electro-magnetic device in said battery-translating circuit, the device adapted to cut the battery off from the load circuit and translating devices and simultaneously establish a circuit between the battery and said electro-magnetic device and energize the ignition circuit, electro-magnetic means permanently in circuit with the generator and actuated by the generated current to disconnect the battery from the starting motor and simultaneously establish a circuit between the generator and the load circuit, electro-magnetic means in the said circuit actuated by current from the generator through one or more translating devices of the load circuit maintaining the ignition circuit during connection of any translating devices thereacross and interrupting the same upon disconnection of the last translating device.

4. The combination with an electric generator, of an internal combustion engine operatively connected therewith, an electric motor for starting the engine, a load circuit having translating devices adapted to be connected thereacross, a storage battery of substantially lower potential than the generated current, disassociated with the load circuit during output of generated current of full potential, a circuit energized by the battery on closing of any translating device across the load circuit adapted to establish a circuit between the battery and starting motor and establish an ignition circuit whereby the engine and connected generator is operated, an electro-magnetic switch permanently connected in circuit with and controlled by the potential of the generator adapted to connect the generator with the load circuit.

5. The combination with an electric generator, of an internal combustion engine operatively connected therewith, an electric motor for starting the engine, a load circuit having translating devices adapted to be connected thereacross, a storage battery of substantially lower potential than the generated current disassociated with the load circuit during operation of the generator, recharging means therefor, a circuit established by the connection of a translating device across the load circuit adapted to establish a circuit between the battery and starting motor and establish an ignition circuit between the battery and engine and operate the same upon rotation by the starting motor, a circuit energized by operation of the generator, electro-magnetic means in the said circuit adapted to operate at nearly full potential of the generator to connect the generator with the load circuit and break the circuit between the battery and starting motor and simultaneously establish a circuit between the battery and the recharging means.

6. The combination with an electric generator, of an internal combustion engine operatively connected therewith, an electric motor for starting the engine, a load circuit having translating devices adapted to be connected thereacross, a storage battery, a circuit energized by the battery, by the closing of a translating device across the load circuit adapted to establish a circuit between the battery and starting motor, and independently establish an ignition circuit for the engine and cut off the battery from the translating device and load circuit, and a circuit established by the generated current on reaching near full potential connecting the generator with the load circuit.

7. The combination with a high voltage electric generator, of an internal combustion engine, an electric motor for starting the engine, a load circuit having translating devices adapted to be connected thereacross, a storage battery, a recharging generator also connected with the engine, a circuit energized by the battery upon the closing of a translating device across the load circuit adapted to establish a circuit between the battery and starting motor, and also establish an ignition circuit for the engine, and simultaneously cut the battery off from the translating device and load circuit, a circuit established by the generated current of high voltage on reaching nearly full potential connecting the high voltage generator with the load circuit, and simultaneously disconnecting the battery from the starting motor and connecting the recharging generator with the battery, and an automatic timer adapted to open the circuit between the recharging generator and the battery after an elapsed interval governed by the total amount of energy drawn from the battery.

8. An automatic system for the generation and distribuation of electric energy comprising a generator having two armamagnetic field, the potential generated in one winding being equal to the potential required by the load circuit and the potential generated in the other winding being equal to or slightly in excess of the potential required to recharge the storage battery, an internal combustion engine for operating the generator, an electric motor for starting the engine, a load circuit having translating devices adapted to be connected thereacross, a storage battery, a circuit energized by the battery upon the closing of the translating device across the load circuit adapted to establish a circuit between the battery and starting motor, and also establish an ignition circuit for the engine and simultaneously cut the battery off from the load circuit, a circuit established by the generated current of high voltage upon reaching nearly full potential, connecting the high voltage generator with the load circuit, and simultaneously disconnecting the battery from the starting motor, and also connecting the generator of low voltage with the battery to recharge the same, and an automatic timer adapted to open the circuit between the low voltage generator and the battery after a recharging.

9. An automatic system for the generation and distribution of electric energy comprising an electric generator of comparatively high voltage, and a generator of comparatively low voltage, an internal combustion engine for operating the generators, an electric motor for starting the engine, a load circuit having translating devices adapted to be connected thereacross, a storage battery, a circuit energized by the battery upon the closing of a translating device adapted to establish a circuit between the battery and starting motor and also establish an ignition circuit for the engine, and simultaneously cut the battery off from the translating device and load circuit, a circuit established by the generated current of high voltage upon reaching nearly full potential connecting the high voltage generator with the load circuit, simultaneously disconnecting the battery from the starting motor and connect the low voltage generator with the battery to recharge the same, and an automatic timer adapted to open the circuit between the low voltage generator and the battery subsequent to the cutting of the battery off from the starting motor.

10. In an automatic system for the generation and distribution of electrical energy, a dynamo-electric machine having two armature windings to generate respectively a comparatively high and comparatively low potential current, an internal combustion engine for operating the said dynamo-electric machine, an electric motor for starting the engine, a load circuit having translating devices adapted to be connected thereacross, a storage battery of a potential equal to the generated low potential current, the battery being arranged to be cut into circuit with the electric motor upon connection of any translating device across the load circuit to start the engine and dynamo electric machine, electro-magnetic means operated by current from the high potential armature winding on reaching nearly full potential adapted to connect the said high potential winding with the load circuit and disconnect the battery and starting motor and simultaneously connect the low potential winding with the battery.

11. In an automatic system for the generation and distribution of electric energy, the combination with an electric generator of comparatively high potential, of an internal combustion engine operatively connected therewith, a load circuit having one or more translating devices adapted to be connected thereacross, a storage battery of comparatively low potential, recharging means therefor, an electric motor operated by a current from the storage battery adapted to start the engine, an ignition circuit for the engine, a circuit independent of the generator including the storage battery and an electromagnetic device established by connection of any translating device across the load circuit, switches controlled by the said electromagnetic device adapted to connect the storage battery across the starting motor and independently establish an ignition circuit and also establish a circuit between the battery and the said electro-magnetic device, said circuit being adapted to maintain the starting motor circuit, the ignition circuit, and the circuit between the electro-magnetic device and the battery, an electro-magnetic device permanently connected with the generator adapted to disconnect the storage battery from all previously established circuits except the ignition circuit and simultaneously establish a circuit between the storage battery and recharging means and a circuit between the load circuit and generator, and electro-magnetic means controlled by current from the generator through the load circuit adapted to maintain the ignition circuit.

12. A system for the generation and distribution of electric energy comprising an electric generator, an internal combustion engine for operating the generator, a starting unit for the engine, a load circuit having translating devices adapted to be connected thereacross, a battery, a circuit established through the battery by the connection of any translating device across the load circuit, an electro-magnetic device in the established circuit through energization of which the starting unit sets the engine into operation, and also establishes an independent ignition circuit,—an electro-magnetic device connected across the brush terminals of the generator adapted to operate at nearly full potential, a normally open circuit closed by actuation of the last named electro-magnetic device connecting the brush terminals and load circuit, a circuit opened by actuation of the last named electro-magnetic device cutting the battery off from the load circuit, and means including the first named electro-magnetic device adapted to break the ignition circuit upon disconnecting the last translating device connected across the load circuit.

13. In an automatic system for the generation and distribution of electric energy, the combination with an electric generator of comparatively high potential of an internal combustion engine operatively connected therewith, a load circuit containing one or more translating devices adapted to be connected thereacross, a storage battery of comparatively low potential disassociated with the load circuit during output of the current of full potential by the generator, recharging means for said battery, an electric motor adapted to be operated by a current from the storage battery to start the engine, an ignition circuit including the storage battery, a circuit independent of the generator and including the storage battery and an electro-magnetic device established by the connection of any translation device across the load circuit; the electro-magnetic device being adapted to operate switches to connect the storage battery across the starting motor and independently connect the battery across the ignition circuit and also establish a circuit between the battery and the said electro-magnetic device adapted to maintain the starting motor circuit, the ignition circuit and the circuit between the electro-magnetic device and the battery, electro-magnetically operated switches permanently in circuit with the generator adapted to disconnect the battery from all circuits except the ignition circuit and simultaneously establish a circuit between the storage battery and recharging means and a circuit between the load circuit and the generator, and electro-magnetic means controlled by the generator current flowing through the load circuit adapted to maintain the ignition circuit.

14. In an automatic electric generating system, the combination of a work circuit, a high voltage generator adapted to supply energy to the work circuit, a fuel-operated engine for driving the generator, a low voltage battery, low voltage dynamo electric apparatus mechanically connected with the engine for starting the engine with energy from the battery and for charging the battery, and means for controlling the starting of the engine by said apparatus and said battery upon the closure of the work circuit and effecting connection between the apparatus and the battery during the operation of the engine.

15. In an automatic electric generating system, the combination of a work circuit, a high voltage generator adapted to supply energy to the work circuit, a fuel operated engine for driving the generator, a low voltage battery, low voltage dynamo electric apparatus mechanically connected with the engine for starting the engine with energy from the battery, and means for controlling the starting of the engine by said apparatus and said battery upon the closure of the work circuit and effecting connection between the apparatus and the battery during the operation of the engine.

In testimony whereof, I sign this specification.

CHARLES L. HOMMEL.

Certificate of Correction.

It is hereby certified that in Letters Patent No. 1,448,219, granted March 13, 1923, upon the application of Charles L. Hommel, of Detroit, Michigan, for an improvement in "Systems for the Generation and Distribution of Electrical Energy," an error appears in the printed specification requiring correction as follows: Page 6, after line 100 insert the syllable and words *ture windings operating under the same;* and that the said Letters Patent should be read with this correction therein that the same may conform to the record of the case in the Patent Office.

Signed and sealed this 8th day of May, A. D., 1923.

[SEAL.]

KARL FENNING,
*Acting Commissioner of Patents.*